(No Model.)
J. MUNTON.
ART OF MAKING CAR WHEELS.
No. 390,695. Patented Oct. 9, 1888.
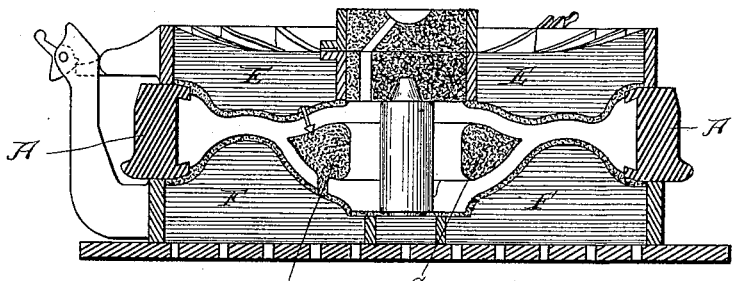
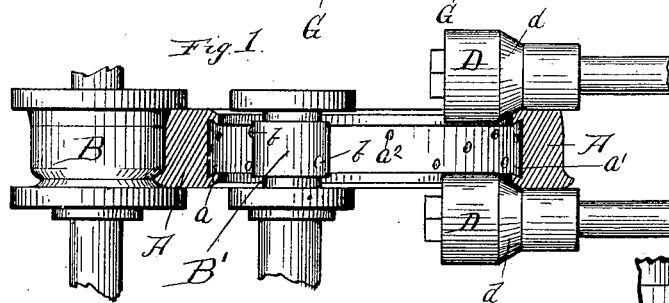
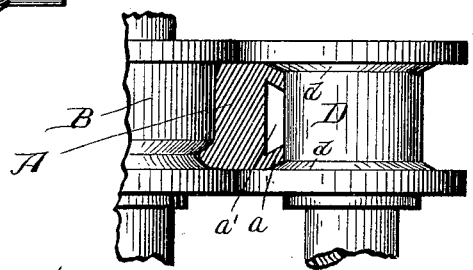
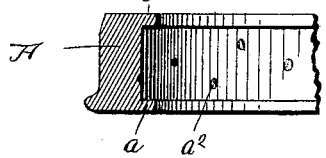
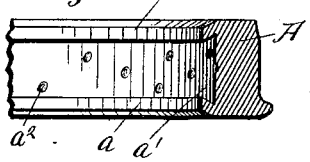
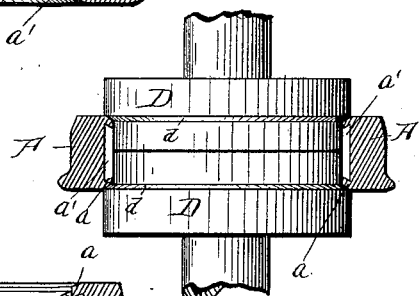
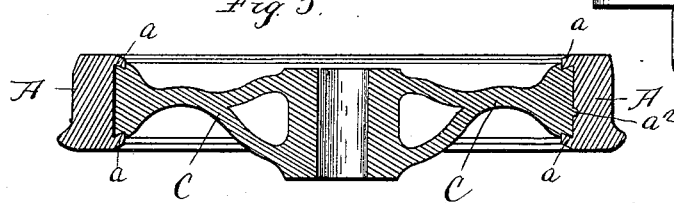
Witnesses:
Lew. C. Curtis.
H. W. Munday.
Inventor:
James Munton.
By Munday Evarts & Adcock
his Att'ys.

UNITED STATES PATENT OFFICE.

JAMES MUNTON, OF MAYWOOD, ILLINOIS.

ART OF MAKING CAR-WHEELS.

SPECIFICATION forming part of Letters Patent No. 390,695, dated October 9, 1888.

Application filed February 4, 1888. Serial No. 263,019. (No model.)

*To all whom it may concern:*

Be it known that I, JAMES MUNTON, a subject of the Queen of Great Britain, (who have declared my intention of becoming a citizen of the United States,) residing in Maywood, in the county of Cook and State of Illinois, have invented a new and useful Improvement in the Art of Manufacturing Car-Wheels, of which the following is a specification.

My invention relates to the art of manufacturing car and locomotive wheels having rolled-steel tires and cast centers. In such wheels the rolled-steel tire is usually provided with a dovetail groove on its inner periphery for the purpose of locking the center and tire together. In making such wheels it has heretofore been customary to reheat the tire after it has been rolled and a dovetailed groove cut or turned therein preparatory to pouring in the molten metal. This reheating of the tire after it has been rolled tends to materially injure the wearing qualities of the tire by taking out the chill left by the rolls on its tread or outer periphery.

It is the object of my invention to provide a method or process of making the wheels whereby the center may be cast within the rolled tire without destroying the chill or hardened surface left upon the tire by the rolls. In making such tires it has heretofore also been a matter of considerable labor and expense to turn or cut the dovetailed groove upon the interior periphery of the tire. By my process this labor and expense are entirely avoided.

My process consists in first rolling the steel tire in a pair of box-rolls, thus forming two plane or right-angle flanges upon the interior periphery of the tire, and next, while the tire is still hot from the rolls, I bend or incline these two parallel flanges toward each other, thus forming a dovetailed groove in the tire between the inclined flanges, and, thirdly, while the tire is still hot, and without reheating it, I place the same within a suitable mold and pour in the molten metal to form the cast-iron center of the tire.

The rolling-mill for rolling the tire with interior plane flanges which I employ may be of any well-known construction familiar to those skilled in the art. The right-angle interior flanges on the tire may be turned or inclined toward each other by any suitable means—as, for example, a pair of beveled or cone-faced pressing-dies adapted to fit the interior of the tire, or a pair of rollers one of which has a pair of cone-faced collars adapted to bear against the interior flanges of the tire and bend them toward each other, or a pair of edging-rollers having beveled shoulders to press against the flanges of the tire, or any other suitable devices adapted to quickly turn the flanges of the tire toward each other and form the dovetail groove. I prefer, however, to provide the rolling-mill with a pair of edging-rollers having beveled shoulders, which may be forced against the interior flanges of the tire the moment the rolling of the tire is completed by the box-rolls, as in this way but little time is lost in turning down the parallel flanges to form the dovetail groove. The moment the interior flanges of the tire are turned down or inclined toward each other the tire should be swung from the rolling-mill without delay and placed in the mold. The heat which the tire still has when placed in the mold directly from the rolling-mill will be sufficient to allow the tire to contract correspondingly to the contraction of the cast-iron center of the wheel, as the iron contracts much less than the steel.

The steel which I use, or prefer to use, for making the tire is of a very hard and tough character, being high in manganese or other alloy to make it hard and give a durable tread to the wheel.

By my process it will be observed that the dovetail groove is made without any cutting or turning of the tire. This saving is a matter of importance, owing to the hard steel of which the tire is made and which cannot be readily turned.

In the accompanying drawings, which form a part of this specification, I have shown at Figure 1 a sectional view of a tire and a pair of box-rolls in elevation, such as may be used for rolling the tire with the plain interior flanges, and also in elevation a pair of edging-rolls having beveled collars suitable for use in turning down the flanges, so as to form a dovetailed groove. At Fig. 2 I have shown a sectional view of the tire in the mold ready for pouring in the molten iron to form the cast center. Figs. 3 and 4 are cross-sections of the tire before and after the flanges are turned down to form the dovetail groove. Fig. 5 is a sectional view of the wheel as produced by my process. Fig. 6 shows a single roll having a pair of conical collars and which operates in conjunction with an ordinary box-roll to incline the interior flanges of the tire. In Fig. 7 I have shown a pair of dies with beveled faces for pressing down the interior flanges of the tire.

The drawings will serve to illustrate my process and render the same more easily and clearly understood in connection with the description.

Similar letters of reference indicate like parts in all the figures.

In the drawings, A represents the tire; $a\ a$, the interior flanges; $a'$, the interior dovetailed groove formed by inclining the flanges $a\ a$ toward each other. The flanges are rolled upon the tire by box-rolls B B'. The interior box-roll, B', is provided on its periphery with one or more small projections, $b$, which serve to make a number of indentations on the interior peripheral surface of the tire. The molten metal of the cast-iron center C, flowing into these indentations $a^2$ in the tire, serves to more rigidly connect and fix the center and tire together.

D D represent a pair of edging-rolls having beveled shoulders $d\ d$, adapted to bear against the flanges $a\ a$ and bend or incline them toward each other. In Fig. 6 a single vertical roll, D, having two beveled shoulders or collars, $d\ d$, operates in conjunction with the box-roll B to accomplish the same purpose.

In Fig. 7 the tire, after being swung from the rolling-mill, is placed in a stamp or press between two dies, D D, having beveled shoulders $d\ d$.

The means indicated in Fig. 1 is that which I prefer to use for inclining the interior flanges of the tire, as the pair of rolls D D may be attached directly to the rolling-mill the same as ordinary plain edging-rolls have heretofore been attached, and after the box-rolls B B' have done their work the rolling of the tire is completed and the rolls D D pressed against the tire the moment the interior box-roll, B', is withdrawn.

In Fig. 2 the mold is shown ready for pouring.

E represents the cope, F the drag, and G the interior of the core of the mold.

The tire A forms a part of the mold, and is placed therein while still hot from the rolling-mill. After being rolled the tire is not reheated, the rolling of the interior of the flanges $a$, the inclining of said flanges to form the dovetailed groove, and the placing of the tire in the mold and forming the cast center therein being all effected in one and the same heat, so that the chill upon the outer periphery of the tire will not be injured by the casting operation. The casting of the center within the tire will not of itself so raise the temperature of the tire as to destroy or injure the chilled and hardened surface produced by the rolls upon the tread of the tire.

The dovetailed groove may be formed on the interior periphery of the tire by bending or inclining only one of the two flanges instead of both. The preferable way, however, is to incline both flanges, as it makes a better shaped dovetailed groove than is made by inclining only one of them.

I claim—

1. The process of making car-wheels with rolled tires and cast-iron centers, consisting in first rolling the tire and then, without reheating the tire, casting the iron center therein, the rolling of the tire and the casting of the center in the same being both effected at one and the same heat, substantially as specified.

2. The process of making car-wheels with rolled-steel tires and cast-iron centers, consisting in, first, rolling the tire with a pair of plain or straight interior flanges; second, bending or inclining the flanges toward each other, and thus forming a dovetailed groove on the interior periphery of the tire, and, finally, casting the iron center in the tire, all three of said steps or operations being performed at one and the same heat of the tire, substantially as specified.

3. The process herein described, consisting in, first, rolling a tire with a pair of plain interior flanges, and, secondly, bending or inclining said flanges toward each other to form a dovetailed groove on the interior of the tire, substantially as specified.

4. The process of forming a dovetail groove in a hard-steel tire without turning or cutting the same, consisting in first rolling the tire with interior flanges and then bending or inclining one or both of said flanges together, substantially as specified.

JAMES MUNTON.

Witnesses:
H. M. MUNDAY,
EDW. S. EVARTS.